United States Patent [19]

Bock et al.

[11] Patent Number: 5,384,068
[45] Date of Patent: Jan. 24, 1995

[54] SWITCHABLE COLUMNAR LIQUID-CRYSTALLINE SYSTEMS

[75] Inventors: Harald Bock; Wolfgang Helfrich; Gerd Heppke, all of Berlin, Germany

[73] Assignee: Hoechst Aktiengesellschaft, Frankfurt am Main, Germany

[21] Appl. No.: 929,947

[22] Filed: Aug. 14, 1992

[30] Foreign Application Priority Data

Aug. 17, 1991 [DE] Germany ............... 4127307

[51] Int. Cl.$^6$ ............... C09K 19/52; C09K 19/32; G02F 1/13
[52] U.S. Cl. ............... 252/299.01; 252/299.62; 359/99; 359/104
[58] Field of Search ............... 252/299.01, 299.05, 252/299.62; 359/99, 103, 104

[56] References Cited

FOREIGN PATENT DOCUMENTS 0350842 1/1990 European Pat. Off. .
0405516 1/1991 European Pat. Off. .

OTHER PUBLICATIONS

A. M. Levelut et al., Structure of the two columnar phases of a chiral triphenylene ester, p. 569. (Abstract of A. M. Levelut et al., J. Physique, vol. 45, Apr. 1984, pp. 745–754).

Lin Lie, Molecular Crystals and Liquid Crystals pp. 41–54, May 1988.

P. Palffy-Muhoray et al., Physical Review Letters, vol. 60, May 30, 1988, pp. 2203–2306.

*Primary Examiner*—Shean Wu
*Attorney, Agent, or Firm*—Curtis, Morris & Safford

[57] ABSTRACT

The invention relates to an electro-optically switchable columnar liquid-crystalline system wherein the columns have ferroelectric transverse polarization.

The molecules in the columns of electro-optically switchable ferroelectric phases are tilted to or otherwise aligned with the longitudinal axis of the columns in such a manner than the columns are ferroelectrically polarized. The ferroelectric polarization is in a direction transverse to the column axis or has at least one transverse component. The polarization direction need not be the same for all columns of a columnar phase. The transverse polarization of the columns is fully or partially realigned by application of an electrical field to the liquid crystal.

The liquid-crystalline system according to the invention can be used to produce electro-optical switching and display devices.

24 Claims, No Drawings

SWITCHABLE COLUMNAR LIQUID-CRYSTALLINE SYSTEMS

The structures of two tilted columnar phases comprising chiral molecules have been described by Levelut et al. (J. Phys. France 45, 745 (1984)). The authors argue that one of the two phases should be ferroelectrically polarized in a direction transverse to the columns. However, due to the fixing of the polarization of each column by the two-dimensional column lattice, they regarded a change in the ferroelectric polarization by electrical fields as being undoubtedly impossible. In this respect, the authors saw a difference from the tilted smectic phases of chiral molecules, which, as a consequence of their ferroelectric polarization, are capable of bistable switching.

The possibility that chiral molecules form tilted columnar phases which are ferroelectric has been discussed in general terms by Palffy-Muhoray et al. (Phys. Rev. Lett. 60, 2303 (1988)). The authors were of the opinion that a macroscopic ferroelectric polarization transverse to the column axes is rather improbable. The question of whether such phases are electrically switchable was not asked.

EP 405516 describes a class of substances with molecules which form pyramidal columnar phases. Here, a correlated alignment of the dipols along the column axes, and thus a ferroelectric phase, is actually achieved. Although the phases described can be electrically switched, i.e. the dipols reverse their direction on application of external electrical fields, the states do not, however, differ optically, so that they cannot be used for displays.

Surprisingly, it has now been found that there are molecules which form ferroelectric columnar phases with which electro-optical displays can be constructed.

The invention thus relates to:

1. an electro-optically switchable columnar liquid-crystalline system wherein the columns have a ferroelectric transverse polarization, and
2. an electro-optical switching and display element which contains a liquid-crystalline system as defined under 1.

The molecules in the columns of electro-optically switchable ferroelectric phases are tilted or otherwise aligned with the longitudinal axis of the columns in such a manner that the columns are ferroelectrically polarized. The ferroelectric polarization is in a direction transverse to the column axis or has at least one transverse component. The polarization direction need not be the same for all columns of a columnar phase. The transverse polarization of the columns is fully or partially realigned by application of an electrical field to the liquid crystal.

Ferroelectric columnar phases may also comprise mixtures of molecules. For example, achiral molecules can form a tilted columnar phase which becomes ferroelectric on admixture of chiral molecules (dopes). Polymeric liquid crystals can also be used to prepare columnar ferroelectric phases.

The ground state of the columnar liquid crystal may also be antiferroelectric, i.e. the transverse polarizations of the columns can cancel each other out so long as, here too, the ferroelectric transverse polarization of all or some of the columns can be realigned by application of an electrical field so that a ferroelectric state is produced. The same also applies to columnar liquid crystals in whose ground state the transverse polyarization of the columns is helical, so that it is on average zero over the length of the individual columns.

The liquid-crystalline system according to the invention can be used, for example, to produce electro-optical switching and display devices. These may in addition contain, inter alia, the following components: two electrodes, two transparent outer plates, which may be identical with the electrodes, and at least one polarizer. In general, the structure of the switching cell can be based on the structure which is conventional when ferroelectric tilted smectic phases are used. However, a columnar liquid crystal must be aligned and switched in a suitable manner in the cell.

The columns in the electro-optical cell should have a uniform alignment. The longitudinal axis of the columns preferably forms an angle of from 45° to 90° with the cell perpendicular. Particular preference is given to systems in which the longitudinal axes are aligned parallel to the conductive limiting surfaces. An alignment of this type frequently occurs automatically in the switching cell during growth of the columnar phases due to cooling of the isotropic liquid, but the columns can point in various directions parallel to the limiting surface.

Uniform alignment of the column longitudinal axes in a direction parallel to the limiting surfaces can be achieved by shearing the unordered columnar phases between outer plates (T. Itoh et al., Liquid Crystals 9, 221 (1991)). Further possible methods for achieving a uniform alignment of the column longitudinal axes include growth of the columnar phases by cooling the isotropic liquid in a temperature gradient or in electrical and magnetic fields, and growth from other liquid-crystalline phases.

If the two-dimensional lattice of the columns is not hexagonal, only two ferroelectric states of opposed polarization are to be expected; these states are physically equivalent stable states. Stable transverse polarization should be parallel to the cell perpendicular or have a component in the direction thereof. For electro-optical use, it is sufficient if this modification is not made until an electrical voltage is applied.

Ferroelectric tilted columnar phases having two stable states can, if they are electrically switchable, be subjected to bistable switching by voltage pulses of opposite sign. The crossed optical main axes of the switching cells rotate from the old to the new directions on reversing the polarity. The intermediate states are also long-lived when the voltage is suddenly switched off and can be used for stepless electro-optical switching.

All molecules which form columnar structures and are switchable can be employed for the liquid-crystalline system according to the invention. Molecule structures which are suitable for this purpose are oblate or disk-like structures. Columnar structure-forming classes of compound which may be mentioned are the following:

laterally polysubstituted aromatic compounds (and complexes thereof with electron acceptors, such as trinitrofluoroenone), for example oligoacyloxy-, -alkoxy-, -alkylmercapto-, -alkoxycarbonyl-, -alkoxycarbonylalkyl-, -acylamino-, -alkoxybenzoyloxy-, -alkylbenzoyloxy-, -alkoxyphenylethynyl and -alkylbenzenes, -triphenylenes, -benzoquinones, -truxenes, -naphthalenes, -5H10H-4,9-dioxa-5,10-dioxopyrenes, -anthraquinones, -tetrabenzocyclododecanes, -tetrapyrazinoporphyrazines, -phthalocyanines, -porphines, -phthalocyanine metal complexes and -pyrenes;

polysubstituted monosaccharides and oligosaccharides, for example pentaacylglucoses, octacylcellobioses, heptaacylmonoalkyldeoxycellobioses, octaacylmaltoses, hexaacylinososes, tetraacylinososes and triacylinososes;

other compounds of similar geometry, for example chained bis-1,3-dionatocopper(II) complexes, aryliminepalladium complexes, N-benzoylated azamacrocycles, benzoylated cyclohexanetriols/catechols, quercitols and similar natural products.

Preferred optically active molecules are those in which as many as possible/one to all of the lateral chains/groups/substituents are chiral. One or more polar groups should be close to the center of asymmetry, and the center of asymmetryand the polar group should be as close as possible to the disk-like core of the molecule. Such chains may be, inter alia: α-fluoroacyl, α-chloroacyl, alkylepoxycarbonyl, α-(acylamino)acyl, α-(acyloxy)acyl and α-(alkoxy)acyl chains, chiral alkylsulfinates, and chiral alkylsulfoxides.

It is also possible for a rigid spacer group such as —OC$_6$H$_4$(CO)— to be present between the chiral chain and the core. The core may carry one or more centers of asymmetry and/or one or more polar groups (for example sugars). In charge-transfer complexes, the acceptor may also be the chiral element (for example O-(tetranitrofluoroenylideneamino)lactic acid esters).

In the systems according to the invention, particular preference is given to substances of the following formulae:

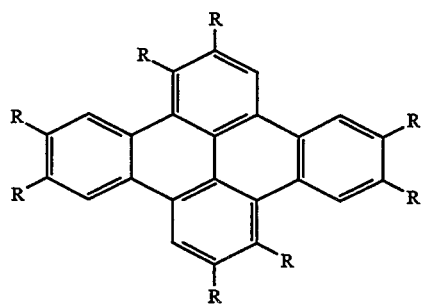

I

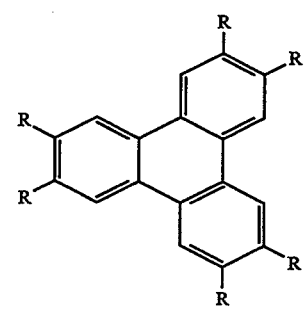

II

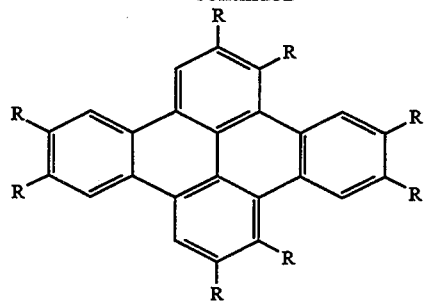

III in which R has the following meaning:

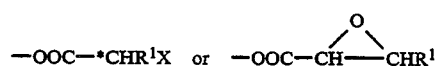

where
R$^1$ is an alkyl radical having 1-10 carbon atoms, and
X is F, Cl, Br, OH, OR$^1$ or an alkyl radical having 1 to 6 carbon atoms which must be different from R$^1$.
R is particularly preferably

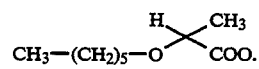

The substances are prepared by esterifying the chiral chain as the acid chloride under basic conditions using hexahydroxydibenzopyrenequinone and -triphenylene. The quinone is first reduced to the octahydroxy compound by addition of zinc.

The chiral chain is formed byalkylation of ethyl lactate using hexyl iodide/silver oxide, hydrolyzed under basic conditions and reacted with thionyl chloride to give the acid chloride. The hexahydroxydibenzopyrenequinone is prepared by this method:
1. Veratrol is iodinated using iodine and mercury oxide;
2. heating with copper powder gives 3,3',4,4'-tetramethoxybiphenyl;
3. the biphenyl is oxidatively dimerized using p-chloranil in sulfuric acid;
4. hexamethoxydibenzopyrenequinone is demethylated using boron tribromide.

Direct p-chloranil/sulfuric acid oxidation of Veratrol and subsequent demethylation using boron tribromide gives hexahydroxytriphenylene.

The invention is described in greater detail in the examples below.

EXAMPLE 1

Synthesis of 1,2,5,6,8,9,12,13-octa(S-2-methyl-3-oxanonanyloxy)dibenzo(e,l)pyrene D$_{M9}$ (=1,2,5,6,8,9,12,13-octa(S-2-O-hexyllactoyloxy)dibenzo(fg,op)naphthacene) and 2,3,6,7,10,11-hexa(S-2-methyl-3-oxanonanyloxy)triphenylene T$_{M9}$.

2,5,6,9,12,13-Hexamethoxydibenzo(e,l)pyrene-1,8-quinone was prepared by the method of O. C. Musgrave & C. J. Webster, J. Chem. Soc. (C), 1971, 1393, from 3,3',4,4'-tetramethoxybiphenyl. The biphenyl was synthesized in accordance with the CA abstract of E. Ritchie, J. Proc. Roy. Soc. New South Wales, 1944, 78, 134, from Veratrol via 4-iodoveratrol.

2,3,6,7,10,11-Hexamethoxytriphenylene was obtained from Veratrol from the method of O. C. Musgrave & C. J. Webster, J. Chem. Soc. (C), 1972, 1397.

2,5,6,9,12,13-Hexahydroxydibenzo(e,l)pyrene-1,8-quinone and 2,3,6,7,10,11-hexahydroxytriphenylene were each produced from the hexamethoxycompound by refluxing 1.5 g for three hours with 5 ml of boron tribromide in 50 ml of benzene under dry nitrogen. 1.1 g of crude product were isolated by pouring the reaction solution into 200 ml of water and filtering off the solid with suction, and were then vacuum-dried and esterified without further purification.

Ethyl S-2-O-hexyllactate was formed by stirring 34.5 g of ethyl S-lactate with 63.6 g of 1-iodohexane and 23.2 g of silver(I) oxide for 24 hours at 100° C. with exclusion of moisture. The product was filtered off and distilled in a water-pump vacuum, giving 20.6 g of product which boiled at 104° C. in a water-pump vacuum.

$^1$H-NMR (90 MHz, CDCl$_3$/TMS): δ (ppm)=0.82 (3H,t,6 Hz), 1.1–1.7 (14H,m), 3.15–3.65 (2H,m), 3.87 (1H,1.7 Hz), 4.15 (2H,q,7 Hz).

S-2-O-Hexyllactic acid was produced from 8 g of the ethyl ester by stirring for three days with 3 g of potassium hydroxide in 100 ml of methanol, evaporating the alcohol, taking up the residue in 100 ml of water and acidifying the solution by means of 31% strength hydrochloric acid. The solution was extracted by shaking three times with 100 ml of ethyl acetate in each case, and the combined ester phases were dried over sodium sulfate and evaporated, giving 6 g of crude acid.

S-2-O-Hexyllactyl chloride was formed from 6 g of crude acid on stirring for two days with 30 ml of thionyl chloride and three drops of dimethylformamide. The excess thionyl chloride was stripped off at 50° C. for two hours in a water-pump vacuum.

D$_{M9}$ (compound of the formula I)

30 ml of benzene, 0.6 g of the hexahydroxyquinone, 5 g of pyridine, a spatula tip of 4-(dimethylamino)pyridine and 1 g of zinc dust were added to the acid chloride remaining after removal of the thionyl chloride from the product formed from 6 g of crude acid. After the mixture had been stirred for three days with exclusion of moisture, the solvent was removed on a rotary evaporator and the dichloromethane-soluble part of the residue was transferred to a short silica-gel column. The product was eluted with dichloromethane and purified by medium-pressure column chromatography in hexane/ethyl acetate 4:1. 0.6 g of D$_{M9}$ were obtained.

$^1$H-NMR (90 MHz, CDCl$_3$/TMS): δ (ppm)=0.65–0.95 (24H,m), 1.05–1.8 (88H,m), 3.2–3.9 (16H,m), 3.95–4.5 (8H,m), 8.40 (2H,s), 8.55 (2H,s), 9.02 (2H,s).

T$_{M9}$ (compounds of the formula II)

40 ml of acetone, 0.8 g of the hexahydroxytriphenylene, 5 g of pyridine and a spatula tip of 4-(dimethylamino)pyridine were added to the acid chloride remaining after removal of the thionyl chloride from the product formed from 6 g of crude acid. After the mixture had been stirred for one day with exclusion of moisture, the solvent was removed on a rotary evaporator and the dichloromethane-soluble part of the residue was transferred to a short silica-gel column. The product was eluted with dichloromethane and purified by medium-pressure column chromatography in hexane/ethyl acetate 4:1. 1.3 g of T$_{M9}$ were obtained.

$^1$H-NMR (90 MHz, CDCl$_3$/TMS): δ (ppm)=0.92 (18H,t,6 Hz), 1.1–1.9 (66H,m), 3.3–4.0 (12H,m), 4.22 (6H,q,7 Hz), 7.90 (6H,s).

EXAMPLE 2

Use of D$_{M9}$ in a liquid-crystal cell (use example)

By shearing the columnar liquid crystal to and fro between the conductive limiting surfaces, the longitudinal axes of the columns were made to lie in one direction and the liquid crystal switched everywhere in the same way. Typical parameters for bistable switching at 90° C. were a sample thickness of 10 μm and ±(30–40) V with a switching angle of the crossed principal axes of ±(20–25)°. A switching cell of this type can be used, for example, for bistable switching to and fro between bright and dark. For this purpose, it must be placed between crossed polarizers in such a way that its principal optical axes coincide with the polarizer axes in one of the switching states.

We claim:

1. An electro-optically switchable columnar liquid-crystalline system having a plurality of columns, wherein the columns have ferroelectric transverse polarization.

2. An electro-optically switchable columnar liquid-crystalline system as claimed in claim 1, containing achiral molecules which form a tilted columnar phase, and chiral dopes.

3. An electro-optically switchable liquid-crystalline system as claimed in claim 1, which contains substances of the formulae I and III.

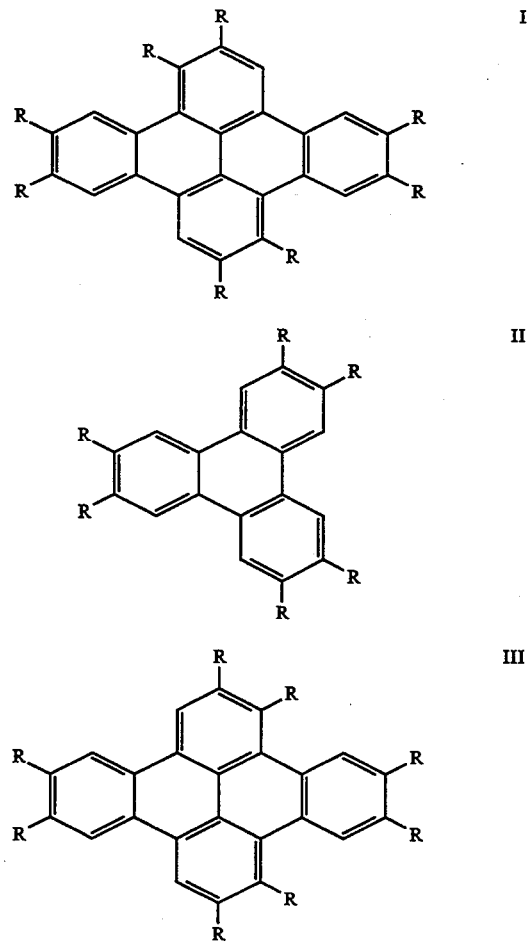

in which R has the following meanings:

—OOC—*CHR¹X or 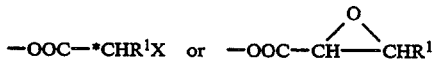

where
R¹ is an alkyl radical having 1–10 carbon atoms, and X is F, Cl, Br, OH, OR¹ or an alkyl radical having 1 to 6 carbon atoms which must be different from R¹.

4. An electro-optical switching and display element which contains a liquid-crystalline system as claimed in claim 1.

5. An electro-optical switching and display element as claimed in claim 4, wherein the columnar liquid crystal is aligned so that the switchable part of the transverse dipole moment has a component in the direction of the applied field.

6. An electro-optical switching and display element as claimed in claim 4, wherein the longitudinal axes of the columns form an angle of from 45° to 90° with the cell perpendicular.

7. An electro-optical switching and display element as claimed in claim 4, wherein the columns are in a uniform direction parallel to the conductive limiting surfaces, and the liquid crystal has a bistable transverse polarization which is parallel to the cell perpendicular.

8. An electro-optical switching and display element as claimed in claim 4, wherein the bistable transverse polarization, which is parallel to the cell perpendicular, is produced by applying an electrical voltage.

9. An electro-optically switchable columnar liquid-crystalline system as claimed in claim 1, containing substances selected from the group consisting of laterally polysubstituted aromatic compounds, polysubstituted monosaccharides, polysubstituted oligosaccharides, chained bis-1,3-dionatocopper(II) complexes, arylimine palladium complexes, N-benzoylated azamacrocycles, benzoylated cyclohexanetriols, benzoylated catechols, and quercitols.

10. An electro-optical switching and display element which contains a liquid-crystalline system as claimed in claim 2.

11. An electro-optical switching and display element as claimed in claim 10, wherein the columnar liquid crystal is aligned so that the switchable part of the transverse dipole moment has a component in the direction of the applied field.

12. An electro-optical switching and display element as claimed in claim 10, wherein the longitudinal axes of the columns form an angle of from 45° to 90° with the cell perpendicular.

13. An electro-optical switching and display element as claimed in claim 10, wherein the columns are in a uniform direction parallel to the conductive limiting surfaces, and the liquid crystal has a bistable transverse polarization which is parallel to the cell perpendicular.

14. An electro-optical switching and display element as claimed in claim 10, wherein the bistable transverse polarization, which is parallel to the cell perpendicular, is produced by applying an electrical voltage.

15. An electro-optical switching and display element which contains a liquid-crystalline system as claimed in claim 9.

16. An electro-optical switching and display element as claimed in claim 15, wherein the columnar liquid crystal is aligned so that the switchable part of the transverse dipole moment has a component in the direction of the applied field.

17. An electro-optical switching and display element as claimed in claim 15, wherein the longitudinal axes of the columns form an angle of from 45° to 90° with the cell perpendicular.

18. An electro-optical switching and display element as claimed in claim 15, wherein the columns are in a uniform direction parallel to the conductive limiting surfaces, and the liquid crystal has a bistable transverse polarization which is parallel to the cell perpendicular.

19. An electro-optical switching and display element as claimed in claim 15, wherein the bistable transverse polarization, which is parallel to the cell perpendicular, is produced by applying an electrical voltage.

20. An electro-optical switching and display element which contains a liquid-crystalline system as claimed in claim 3.

21. An electro-optical switching and display element as claimed in claim 20, wherein the columnar liquid crystal is aligned so that the switchable part of the transverse dipole moment has a component in the direction of the applied field.

22. An electro-optical switching and display element as claimed in claim 20, wherein the longitudinal axes of the columns form an angle of from 45° to 90° with the cell perpendicular.

23. An electro-optical switching and display element as claimed in claim 20, wherein the columns are in a uniform direction parallel to the conductive limiting surfaces, and the liquid crystal has a bistable transverse polarization which is parallel to the cell perpendicular.

24. An electro-optical switching and display element as claimed in claim 20, wherein the bistable transverse polarization, which is parallel to the cell perpendicular, is produced by applying an electrical voltage.

* * * * *